US011352814B2

(12) United States Patent
Astier et al.

(10) Patent No.: US 11,352,814 B2
(45) Date of Patent: Jun. 7, 2022

(54) DEVICE FOR LOCKING A THREADED ROD IN A TAPPED TUBE

(71) Applicant: LISI AEROSPACE, Paris (FR)

(72) Inventors: Yannick Astier, Allogny (FR); Bastien Bellavia, Mereau (FR); Boris Hummel, Quincy (FR)

(73) Assignee: LISI AEROSPACE, Paris (FR)

( * ) Notice: Subject to any disclaimer, the term of this patent is extended or adjusted under 35 U.S.C. 154(b) by 290 days.

(21) Appl. No.: 16/814,995

(22) Filed: Mar. 11, 2020

(65) Prior Publication Data

US 2020/0291688 A1    Sep. 17, 2020

(30) Foreign Application Priority Data

Mar. 14, 2019    (FR) ...................................... 1902632

(51) Int. Cl.
*E05B 63/06*    (2006.01)
*E05C 19/10*    (2006.01)

(52) U.S. Cl.
CPC .............. *E05B 63/06* (2013.01); *E05C 19/10* (2013.01)

(58) Field of Classification Search
CPC ........... Y10T 292/0911; Y10T 292/216; Y10T 292/0926; Y10T 292/0928; E05B 63/06; E05B 65/0817; E05C 19/10; E05C 19/14; E05C 19/145; E05C 15/0086; E05C 3/045; Y10S 292/49; Y10S 292/61; Y10S 292/53; Y10S 292/54
See application file for complete search history.

(56) References Cited

U.S. PATENT DOCUMENTS 2,632,663 A * 3/1953 Croft ....................... E05C 19/14
292/113
2,821,419 A * 1/1958 Walton ..................... B64C 13/02
411/948
2,904,141 A * 9/1959 Henrichs ................. B64D 29/06
292/108

(Continued)

FOREIGN PATENT DOCUMENTS

EP    585952 A2 *    3/1994    ......... B62D 33/0207
FR    2104514          4/1972

(Continued)

OTHER PUBLICATIONS

Robelin, Farrice, French Search Report, dated Nov. 6, 2019, 2 pages, Institut National de la Propriété Industrielle, France.

*Primary Examiner* — Kristina R Fulton
*Assistant Examiner* — Steven A Tullia
(74) *Attorney, Agent, or Firm* — Henricks Slavin LLP

(57) ABSTRACT

The present invention relates to a locking device (10), comprising a threaded rod (12) and a tapping tube (14), which are movable relative to each other. An outer surface of the tube includes a first anti-rotation form.
The device further comprises: a locking sleeve (16) positioned around the rod and comprising a second anti-rotation form (60, 62) capable of being assembled to the first anti-rotation form; and an elastic element (18) connected to the locking sleeve.
In a locked position, the first (38, 40) and second (60, 62) anti-rotation forms are assembled; and in a release position, said anti-rotation forms are axially spaced apart, whereby the tube is free to rotate relative to the sleeve.

10 Claims, 7 Drawing Sheets

(56) References Cited

U.S. PATENT DOCUMENTS

| | | | | |
|---|---|---|---|---|
| 3,442,541 A | * | 5/1969 | Metz | F16L 37/1215 |
| | | | | 285/317 |
| 3,736,891 A | | 6/1973 | Parsons | |
| 3,837,753 A | * | 9/1974 | Weiste | F16C 7/06 |
| | | | | 403/44 |
| 4,092,080 A | * | 5/1978 | Bradley, Jr. | F16B 39/10 |
| | | | | 411/935 |
| 4,540,206 A | * | 9/1985 | Frame | E05C 19/14 |
| | | | | 292/DIG. 60 |
| 4,602,812 A | * | 7/1986 | Bourne | E05C 19/145 |
| | | | | 292/DIG. 60 |
| 4,684,284 A | * | 8/1987 | Bradley, Jr. | F16B 39/10 |
| | | | | 411/270 |
| 4,798,408 A | * | 1/1989 | Harmon | E05B 15/025 |
| | | | | 292/341.18 |
| 4,852,923 A | * | 8/1989 | Harmon | E05B 15/025 |
| | | | | 292/DIG. 60 |
| 5,366,313 A | * | 11/1994 | LaBarre | E05C 17/30 |
| | | | | 403/322.2 |
| 5,429,447 A | * | 7/1995 | Wood | F16B 7/06 |
| | | | | 403/314 |
| 5,620,212 A | | 4/1997 | Bourne et al. | |
| 5,702,196 A | * | 12/1997 | Petercsak | F16B 7/06 |
| | | | | 403/46 |
| 5,765,957 A | * | 6/1998 | Connell | F16C 7/06 |
| | | | | 403/44 |
| 5,950,997 A | * | 9/1999 | Metz | F16B 39/10 |
| | | | | 411/935 |
| 6,659,399 B1 | * | 12/2003 | Bagnoli | F16B 7/1463 |
| 6,966,567 B2 | * | 11/2005 | McLaughlin | B60G 7/003 |
| | | | | 403/46 |
| 7,179,011 B1 | * | 2/2007 | Cohen | F16B 37/044 |
| | | | | 403/315 |
| 7,357,593 B1 | * | 4/2008 | Florence | B25G 3/12 |
| | | | | 403/321 |
| 8,371,767 B2 | * | 2/2013 | Uhl | F16C 7/06 |
| | | | | 403/46 |
| 9,188,261 B2 | * | 11/2015 | Marc | F16L 19/005 |
| 9,567,784 B2 | | 2/2017 | Defrance et al. | |
| 10,047,787 B2 | * | 8/2018 | Cheng | F16B 7/1463 |
| 2005/0029768 A1 | * | 2/2005 | McLaughlin | B60G 7/003 |
| | | | | 403/46 |
| 2006/0163885 A1 | * | 7/2006 | Eriksson | F16B 2/185 |
| | | | | 292/247 |
| 2009/0283634 A1 | * | 11/2009 | Tran | F16B 7/06 |
| | | | | 403/314 |
| 2011/0227350 A1 | * | 9/2011 | Do | E05C 19/145 |
| | | | | 292/105 |
| 2012/0102842 A1 | * | 5/2012 | Fournie | E05C 19/145 |
| | | | | 292/200 |
| 2012/0151724 A1 | * | 6/2012 | DeFrance | F16C 7/06 |
| | | | | 403/44 |
| 2013/0175419 A1 | * | 7/2013 | Wheeler | E05C 19/14 |
| | | | | 292/DIG. 60 |
| 2013/0328326 A1 | * | 12/2013 | DeFrance | B64D 29/06 |
| | | | | 292/114 |
| 2015/0284978 A1 | * | 10/2015 | Artin | E05C 19/145 |
| 2016/0264250 A1 | * | 9/2016 | Hernandez | B64D 29/06 |
| 2017/0058568 A1 | * | 3/2017 | Do | E05C 19/145 |
| 2017/0058583 A1 | * | 3/2017 | Kim | E05C 19/145 |
| | | | | 292/200 |
| 2017/0260782 A1 | * | 9/2017 | Kim | E05B 13/002 |

FOREIGN PATENT DOCUMENTS

| | | | | |
|---|---|---|---|---|
| FR | 2966555 | | 8/2013 | |
| WO | WO-2011115792 A1 | * | 9/2011 | ............ B64C 1/1446 |

* cited by examiner

DEVICE FOR LOCKING A THREADED ROD IN A TAPPED TUBE

CROSS REFERENCE TO RELATED APPLICATIONS

This application is a National Application claiming priority to FR 1902632, filed Mar. 14, 2019, the entire contents of which is incorporated herein by reference.

The present invention concerns a locking device, of the type comprising: a substantially rectilinear rod, a first end of said rod comprising a thread; a substantially rectilinear tube, a first open end of said tube comprising a tapping capable of cooperating with the thread of the rod in an engaged configuration of the device, said tube and the rod thus being movable relative to each other along a main axis; the rod comprising a longitudinal groove; an external surface of the tube, close to the first end, comprising a first anti-rotation form.

This type of rod-tube assembly is used particularly in mechanical connections of adjustable length, such as a connecting rod. In another application, such a rod-tube assembly connects a hook to a lock adapter, in a similar manner to the hook latch described in document FR2966555B1.

In order to maintain the length of the rod-tube assembly in a fixed position, it is preferable to provide such an assembly with a locking device, preventing the rod and tube from inopportune pivoting relative to each other.

The purpose of the present invention is to provide a locking device capable of securing the positions of the rod and the tube relative to each other, while enabling easy unlocking to modify said positions by screwing and unscrewing.

For this purpose, the invention relates to a locking device of the above-mentioned type, in which: a locking sleeve capable of being positioned around the rod in said engaged configuration, a first end of said sleeve comprising an inner lug capable of sliding axially in the longitudinal groove of said rod, a second end of said sleeve comprising a second anti-rotation form capable of being assembled with the first anti-rotation form, so as to prevent the rotation of the tube and the sleeve relative to the main axis; and an elastic element connected to the locking sleeve, said locking sleeve and said elastic element being movable between a locked position, in which the first and second anti-rotation forms are assembled; and a release position, in which the first and second anti-rotation forms are spaced apart along the main axis, the tube thus being free to rotate relative to the sleeve.

Among other beneficial aspects of the invention, the locking device includes one or more of the following features, taken individually or in accordance with all technically possible combinations:
- the locking device is configured in such a way that, in the release position, the elastic element is in a higher state of compression than in the locked position;
- the sleeve comprises an inner chamber extending between the inner pin and the second anti-rotation form;
- the locking device is configured in such a way that, in the release position, the first anti-rotation form of the tube is positioned in the inner chamber of the sleeve;
- the elastic element is a compression spring positioned around the rod in the inner chamber;
- a first and second end of the compression spring are respectively in abutment against the sleeve and the first end of the tube;
- One end of the longitudinal groove, opposite the first end of the rod, is closed so is as to form an axial stop;
- the first and second anti-rotation forms comprise flats (40, 62) substantially parallel to the main axis.

The invention further relates to an assembly comprising a locking device as described above.

According to a first embodiment, the assembly is a connecting rod comprising a coupling component of the connecting rod end type, connected to a second end of the rod.

In a second embodiment, the assembly is a hook latch comprising: an adapter connected to a second end of the tube; and a hook connected to a second end of the rod.

The invention will be better understood after reading the following description, which is provided solely as a non-limiting example, and with reference to the drawings, in which:

FIGS. 1 to 5 and FIG. 7 show a locking device 10 according to an embodiment of the invention.

Figure 7:
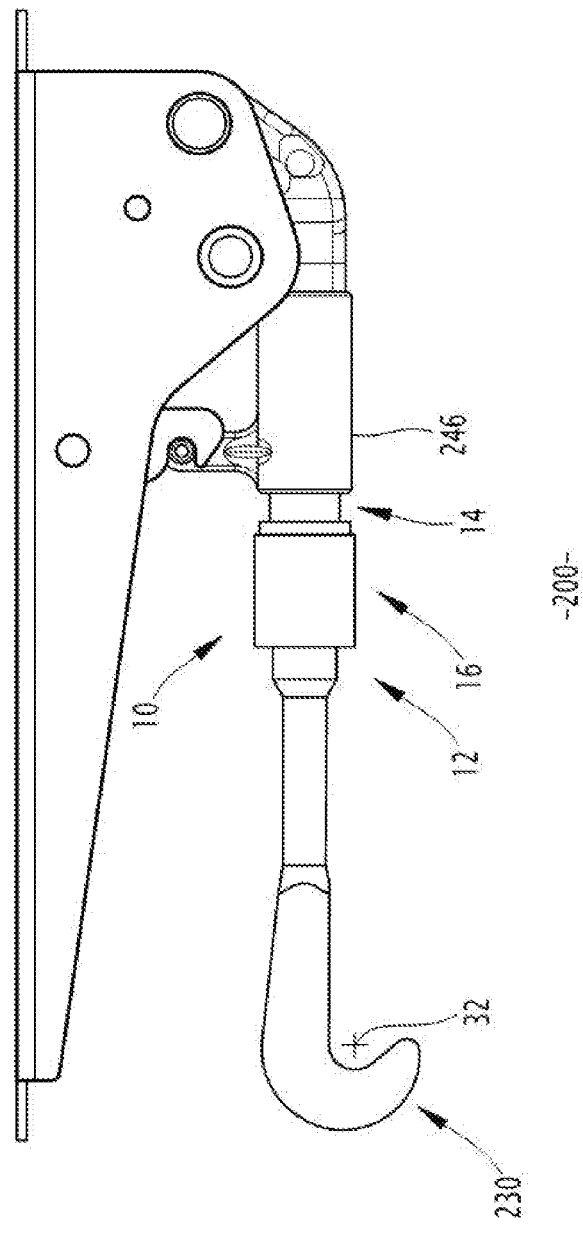
FIG. 7 is a side view of a second assembly comprising a locking device according to a second embodiment of the invention.

In the embodiment shown in FIGS. 1 to 5, the locking device 10 is part of a first connecting rod type assembly 100. In the embodiment of FIG. 7, the locking device 10 is part of a second hook latch type assembly 200, similar to the latch described in document FR2966555B1.

The following description of device 10 relates to the first 100 and second 200 assemblies.

The locking device 10 comprises: a rod 12; a tube 14; a locking sleeve 16 and an elastic element 18.

The rod 12 has a substantially rotationally cylindrical shape, extending along a main axis 20 between a first 22 and second 24 end. A radial surface of the rod comprises a thread 26 near the first end 22.

The rod 12 also comprises a longitudinal groove 27, open at the first end 22 and extending to another closed end, forming a first axial stop 28 close to the second end 24 of the rod.

In the embodiments shown in FIGS. 1 to 5 and 7, the second end 24 of the rod is connected to a coupling component 130, 230. More specifically, the first assembly 100 in FIGS. 1 to 5 includes a first coupling component 130 such as a connecting rod end. The second assembly 200 in FIG. 7 includes a second coupling component 230 such as a hook. The coupling component 130, 230, for example, defines a rotational axis 32 substantially perpendicular to the main axis 20.

The tube 14 extends in a substantially rectilinear line from a first open end 34. Near said first end 34, an internal surface of said tube comprises a tapping 36 capable of cooperating with the thread 26.

In an engaged configuration of the device 10, as shown in FIGS. 1 to 5, the first end 22 of the rod 12 is received in the tube 14 and the thread 26 is engaged on the tapping 36.

A radial outer surface of the tube 14 comprises an anti-rotation form 38, adjacent to the first end 34. Preferably, the anti-rotation form 38 comprises flats or sides 40 substantially parallel to the main axis 20. In the embodiment shown, the anti-rotation form 38 consists of twelve identical sides 40, but it can also have six or eight sides, or a multi-lobed shape, for example with six lobes.

The flats 40 of the anti-rotation form 38 extend axially between the first end 34 of the tube 14 and an edge 41, defining a length 42.

Adjacent to the edge 41 of the anti-rotation form 38, the outer radial surface of the tube 14 includes a rotation zone 43 that is rotationally cylindrical in shape. The rotation area 43 has a diameter 44 less than or equal to a minimum transverse dimension of the anti-rotation form 38.

Preferably, the area of rotation 43 extends to a second axial stop 46 formed by an enlarged area of the outer radial surface of the tube 14, said enlarged area being adjacent to the area of rotation 43.

As shown in the embodiment in FIGS. 1 to 5, a second end (not shown) of the tube 14 is connected to a connecting rod end. As shown in the embodiment in FIG. 7, the second end of the tube 14 is attached to an adapter 246 of the hook latch 200.

Figure 6:
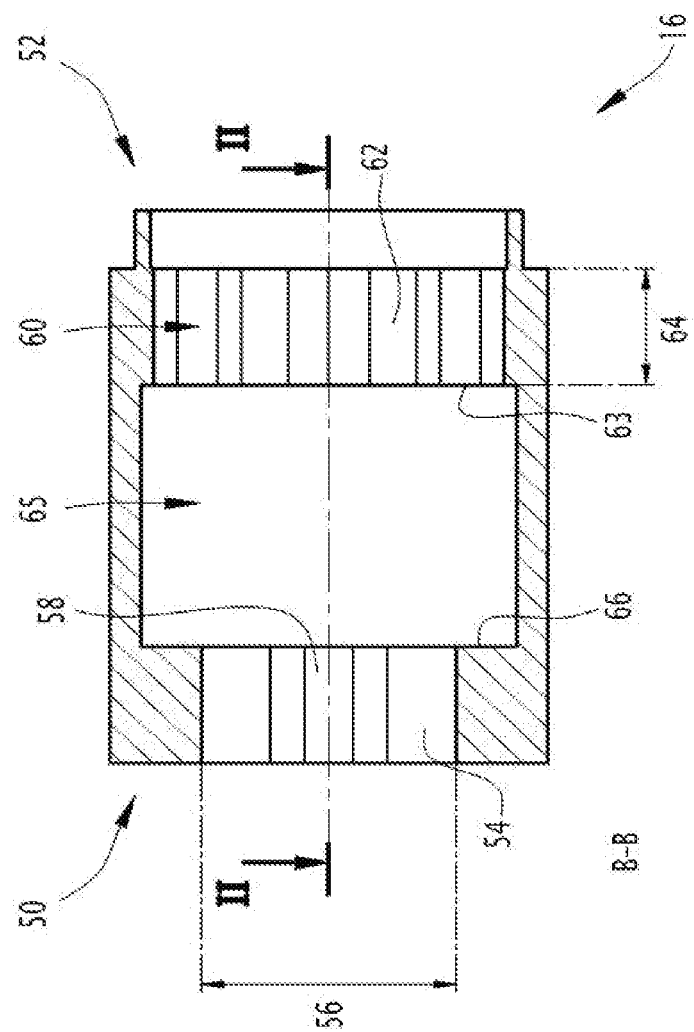
FIG. 6 is a sectional view of an element of the device in FIG. 1.

The locking sleeve 16, shown alone in FIG. 6, extends axially between a first 50 and a second 52 open ends. In the embodiment shown, an outer radial surface of the sleeve 16 has a substantially rotationally cylindrical shape.

The locking sleeve 16 comprises a first inner wall 54, substantially rotationally cylindrical, adjacent to the first end 50. A diameter 56 of said first inner wall 54 is slightly larger than a maximum diameter of the thread 26 of the rod 12.

The sleeve 16 comprises a pin 58 forming a projection relative to the first inner wall 54. As will be detailed hereinafter, the pin 58 is configured to slide axially in the longitudinal groove 27 of the rod 12.

The locking sleeve 16 comprises a second inner wall 60, adjacent to the second end 52. The second inner wall 60 comprises a shape substantially complementary to the anti-rotation form 38 of the tube 14. In particular, the second inner wall 60 comprises flats 62 capable of being assembled with the flats 40 of the tube 14.

The flats 62 of the second inner wall 60 extend axially between the second end 52 of the sleeve 16 and an inner edge 63, defining a length 64. In the embodiment shown, the length 64 of the flats 62 of the second inner wall 60 is substantially equal to the length 42 of the flats 40 of the anti-rotation form 38.

Between the first 54 and second 60 inner walls, the locking sleeve 16 comprises an inner chamber 65, which is substantially rotationally cylindrical in shape. The inner chamber 65 comprises a larger diameter than the first inner wall 54 and has an annular end 66, adjacent to said first inner wall. The diameter of the inner chamber 65 is equal to or greater than a maximum transverse dimension of the anti-rotation form 38.

In the engaged configuration, the elastic element 18 is positioned in the inner chamber 65 of the locking sleeve 16. Preferably, the elastic element 18 is a helical compression spring. An inner diameter of the coils 68 of said spring 18 is greater than the maximum diameter of the thread 26 of the rod 12. An outer diameter of said coils 68 is preferably less than or equal to the minimum transverse dimension of the anti-rotation form 38.

A resting length of the spring 18 is greater than a length 70 of the inner chamber 65 of the sleeve 16. In the embodiment shown, said resting length of the spring 18 is greater than the length 70 plus the length 64 of the second inner wall 60.

In the engaged configuration of FIGS. 1 to 5, the locking sleeve 16 is positioned around the rod 12 and the tube 14, with the pin 58 located in the longitudinal groove 27. The sleeve 16 is thus rotationally prevented and is movable in translation relative to the rod 12 along the main axis 20.

Furthermore, in said engaged configuration, the spring 18 is positioned around the rod 12. A first and second axial ends of said spring 18 are respectively in abutment against the annular end 66 of the inner chamber 65 and on the first end 34 of the tube 14.

FIGS. 1 and 2, FIG. 3 and FIG. 4 show the device 10 of the first assembly 100 in a first, second and third, so-called locked position respectively. Similarly, FIG. 7 shows the device 10 of the second assembly 200 in the first locked position.

In each of said first, second and third locked positions, the first end 34 of the tube 14 is positioned inside the sleeve 16, the second inner wall 60 of said sleeve being in contact with the anti-rotation form 38 of said tube. More specifically, each flat 40 of the anti-rotation form 38 is in abutment against a corresponding flat 62 of the second inner wall 60. By means of the pin 58, the rod 12 is thus rotationally prevented relative to the tube 14.

In addition, at the first end 50 of the sleeve 16, the pin 58 is in abutment against the first axial stop 28 formed by the longitudinal groove 27. The spring 18 is thus held inside the sleeve 16.

Figure 1:
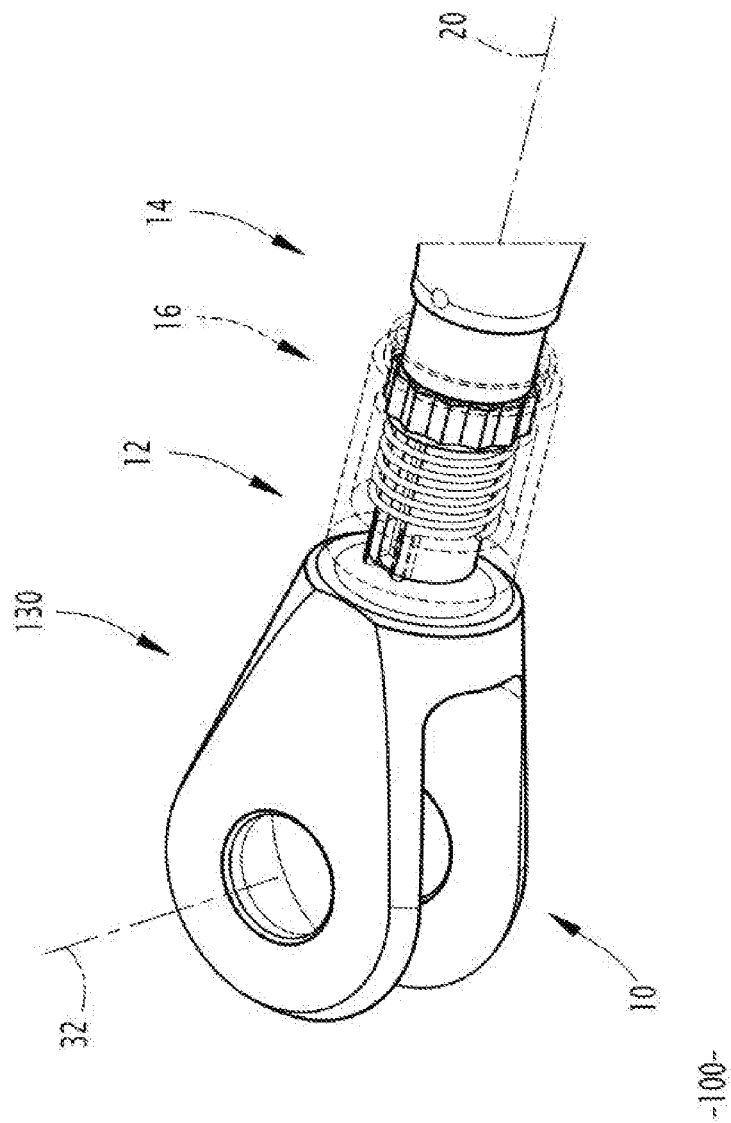
FIG. 1 is a perspective view, in partial transparency, of a first assembly comprising a locking device according to a first embodiment of the invention, in a first position.
Figure 2:
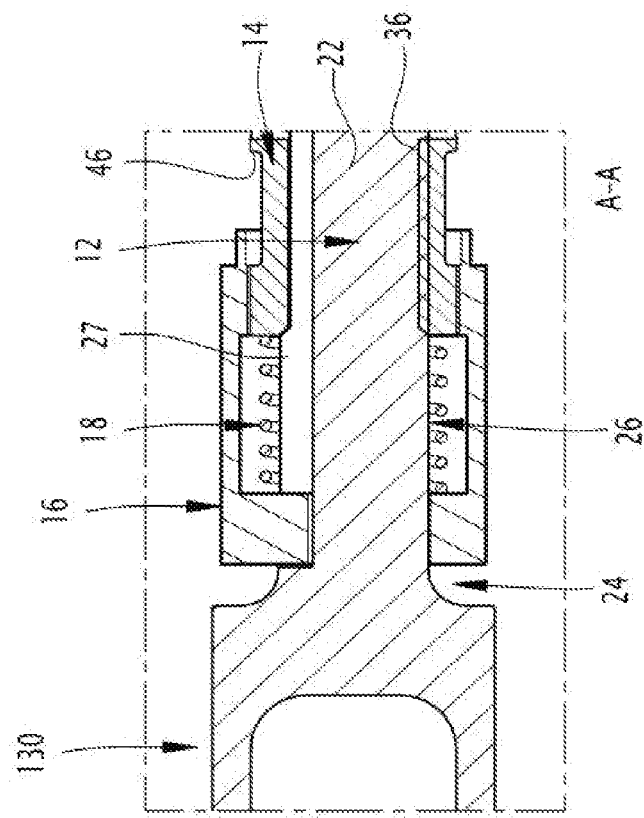
FIG. 2 is a sectional view of the device in FIG. 1 in the first position.

In the first position of FIGS. 1, 2 and 7, called the intermediate locked position, the tube 14 is in a first axial position, called the intermediate position, relative to the rod 12. More specifically, the first end 34 of the tube 14 is substantially next to the inner edge 63 of the second inner wall 60 and the edge 41 of the flats 40 is substantially next to the second end 52 of the sleeve 16. The spring 18 is in a first intermediate state of compression.

Figure 3:
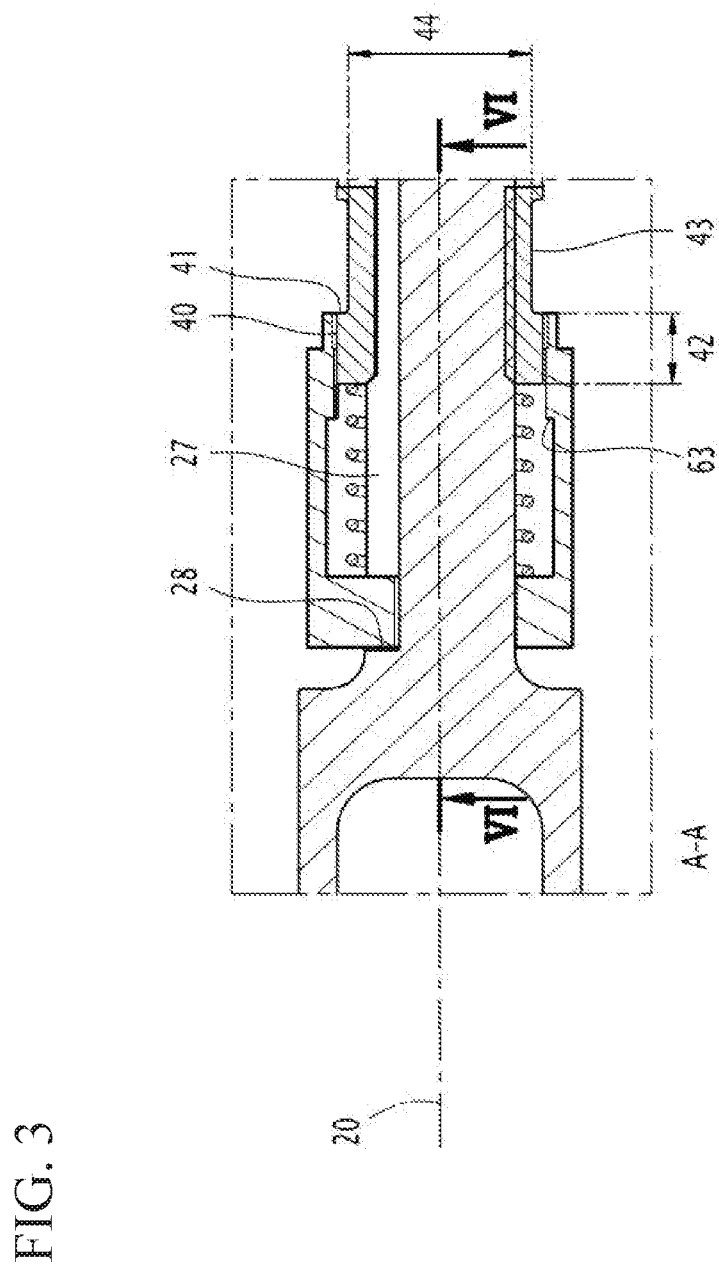
FIGS. 3, 4 and 5 are sectional views of the device in FIG. 1, in a second, third and fourth position, respectively.

In the second position of FIG. 3, called the extended locked position, the tube 14 is in a second axial position, called the extended position, relative to the rod 12. More specifically, the first end 34 of the tube 14 is positioned between the inner edge 63 and the second end 52 of the sleeve 16; and the edge 41 of the flats 40 is positioned outside said sleeve. The spring 18 is in a second lower state of compression than in the intermediate locked position.

Figure 4:
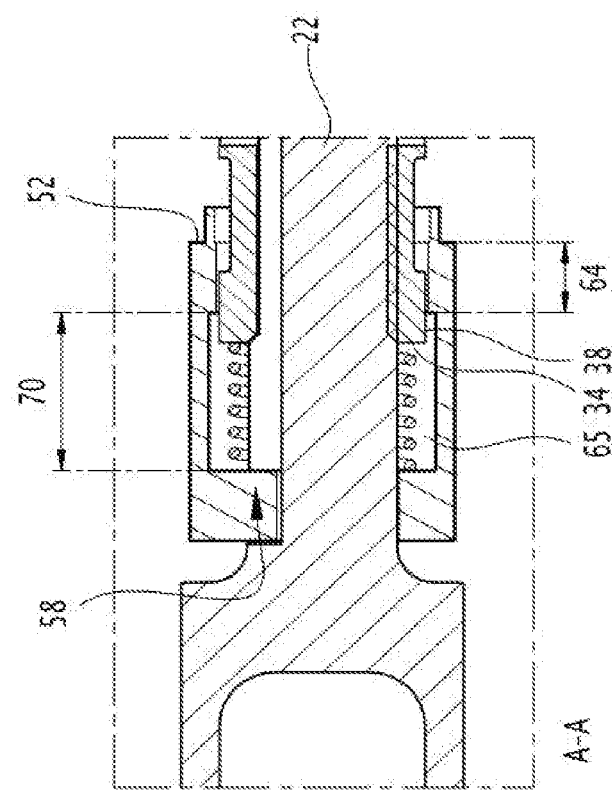

In the third position of FIG. 4, called the retracted locked position, the tube 14 is in a third axial position, called the retracted position, relative to the rod 12. More specifically, the first end 34 of the tube 14 is positioned in the inner chamber 65 and the edge 41 of the flats 40 is positioned between the inner edge 63 and the second end 52 of the sleeve 16. The spring 18 is in a third higher state of compression than in the intermediate locked position.

Figure 5:
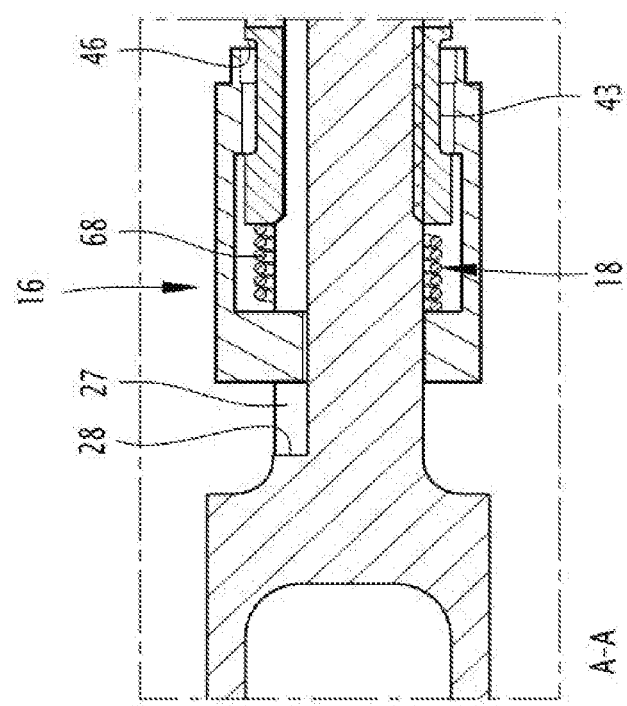

FIG. 5 shows the device 10 in a fourth position, called the release position. The sleeve 16 is moved towards the second axial stop 46 of the tube 14 and away from the first axial stop 28 of the rod 12. The second inner wall 60 of said sleeve is thus axially facing the rotation zone 43 of the tube 14. The sleeve 16 is therefore free to rotate relative to said tube 14.

Furthermore, in the release position, the entire anti-rotation form 38 of said tube, including the edge 41, is received in the inner chamber 65 of the sleeve 16. The coils 68 are moved closer together relative to the locked positions described above; the spring 18 is thus in a fourth state of compression higher than in the first, second and third locked positions.

An assembly method for the device 10 of the first 100 or the second 200 assembly will now be described. The rod 12 is assembled to the sleeve 16 by inserting the first end 22 of the rod into the first end 50 of the sleeve, the pin 58 being positioned in the longitudinal groove 27. The spring 18 is then threaded around the rod 12 and inserted into the sleeve 16 through the second end 52. With one end of the spring 18 at rest being in abutment against the annular end 66 of the sleeve 16, the other end of said spring emerges from the second end 52 of said sleeve.

The first end 34 of the tube 14 is then screwed onto the first end 22 of the rod 12 emerging from the sleeve, then said tube and said rod are screwed together until the spring 18 is slightly compressed between said first end 34 of the tube and the annular end 66 of the sleeve 16, the first end 50 of said sleeve being in abutment against the first axial stop 28 of the rod 12.

The screwing is continued to an angular position of the tube 14 relative to the rod 12, corresponding to an alignment of the flats 40 of the anti-rotation form 38 with the flats 62 of the second inner wall 60 of the sleeve 16, the flats being axially offset along the main axis 20.

Axial load is then exerted on the sleeve 16 so that it moves away from the first axial stop 28, in the direction of the second axial stop 46 of the tube 14. The second inner wall 60 slides against the anti-rotation form 38 until it is facing the rotation area 43, in the release position shown in FIG. 5.

The screwing of the tube 14 onto the rod 12 is then continued until the desired relative axial position between the rod and the screw is achieved, in which the angular position of the flats 40 of the tube 14 corresponds to the angular position of the flats 62 of the screw. The axial stress on the sleeve 16 is then released, the spring 18 bringing the first end 50 of said sleeve back into abutment against the first axial stop 28.

Depending on the axial position of the tube 14 relative to the rod 12, the device 10 is then in the intermediate, extended or retracted locked position shown in FIG. 1-2, 3 or 4 as described above.

In order to lock the tube 14 relative to the rod 12 in a given axial position, it is sufficient to move the sleeve 16 away from the first axial stop 28 again, to the release position, then to screw or unscrew said tube 14 to the desired axial position, and finally to release the sleeve which returns to one of the locked positions described above.

The number of possible locked positions of the tube 14 relative to the rod 12 depends in particular on the lengths 42 and 64 respectively of the anti-rotation form 38 and the second inner wall 60, as well as on the number of flats 40, 62.

In a variant not shown, a visual marking such as a scale is applied, for example, on an outer surface of the tube 14, to identify the corresponding locked position for each setting.

The invention claimed is:

1. A locking device comprising:
    a substantially rectilinear rod, a first end of said rod comprising a thread;
    a substantially rectilinear tube, a first open end of said tube comprising a tapping capable of cooperating with the thread of the rod in an engaged configuration of the device, said tube and the rod thus being movable relative to each other along a main axis;
    the rod comprising a longitudinal groove;
    an outer surface of the tube, close to the first end, comprising a first anti-rotation form;
    the locking device being characterized in that it comprises:
        a locking sleeve capable of being positioned around the rod in said engaged configuration, a first end of said sleeve comprising an inner pin capable of sliding axially in the longitudinal groove of said rod,
        a second end of said sleeve comprising a second anti-rotation form capable of being assembled with the first anti-rotation form, so as to prevent the rotation of the tube and the sleeve relative to the main axis; and
        an elastic element connected to the locking sleeve,
        said locking sleeve and said elastic element being movable between a locked position, in which the first and second anti-rotation forms are assembled; and a release position, in which the first and second anti-rotation forms are spaced apart along the main axis, the tube thus being free to rotate relative to the sleeve.

2. A locking device according to claim 1, configured such that, in the release position, the elastic element is in a higher state of compression than in the locked position.

3. A locking device according to claim 1, in which the sleeve comprises an inner chamber extending between the inner pin and the second anti-rotation form.

4. A locking device according to claim 3, configured such that, in the release position, the first anti-rotation form of the tube is positioned in the inner chamber of the sleeve.

5. A locking device according to claim 3, wherein the elastic element is a compression spring positioned in the inner chamber, around the rod.

6. A locking device according to claim 5, in which a first and second end of the compression spring are in abutment respectively against the sleeve and the first end of the tube.

7. A locking device according to claim 1, in which one end of the longitudinal groove, opposite to the first end of the rod, is closed so as to form an axial stop.

8. A locking device according to claim 1, in which the first and second anti-rotation forms comprise flats substantially parallel to the main axis.

9. A connecting rod comprising a locking device according to claim 1, said connecting rod further comprising a coupling component of the connecting rod end type, connected to a second end of the rod.

10. Hook latch comprising:
    a locking device according to claim 1;
    an adapter connected to a second end of the tube; and
    a hook connected to a second end of the rod.

* * * * *